US012791079B2

(12) United States Patent
Nikola

(10) Patent No.: US 12,791,079 B2
(45) Date of Patent: Nov. 10, 2026

(54) METHOD FOR OPERATING AN ADJUSTABLE OSCILLATION DAMPER WITH A CONNECTED PUMP

(71) Applicant: ZF Friedrichshafen AG, Friedrichshafen (DE)

(72) Inventor: Michael Nikola, Volkach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 553 days.

(21) Appl. No.: 18/386,507

(22) Filed: Nov. 2, 2023

(65) Prior Publication Data

US 2024/0159290 A1 May 16, 2024

(30) Foreign Application Priority Data

Nov. 16, 2022 (DE) ..................... 10 2022 212 179.1

(51) Int. Cl.
*F16F 9/46* (2006.01)

(52) U.S. Cl.
CPC ........ *F16F 9/466* (2013.01); *B60G 2202/416* (2013.01)

(58) Field of Classification Search
CPC .. F16F 9/46; F16F 9/466; B60G 13/08; B60G 2204/62; B60G 2202/416; B60G 2600/44; B60T 2500/104; F04B 11/00
See application file for complete search history.

(56) References Cited

U.S. PATENT DOCUMENTS 11,440,366 B1 * 9/2022 O'Shea .................. B60G 13/08
11,999,214 B2 * 6/2024 Belter .................... B60G 11/30
12,246,568 B2 * 3/2025 Witte ................. B60G 17/0152
12,384,212 B1 * 8/2025 Randall .............. B60G 17/0152
2010/0131114 A1 * 5/2010 Stothers ................. F16F 7/1011 188/379
2012/0132476 A1 * 5/2012 Gastineau ............. F16F 7/1011 180/300
2020/0088214 A1 * 3/2020 Woodard ................ F15B 1/021
2022/0154798 A1 * 5/2022 Förster ................... B60G 13/08
(Continued)

FOREIGN PATENT DOCUMENTS

DE 102015214639 2/2017
DE 102015218494 3/2017
(Continued)

OTHER PUBLICATIONS

Office Action of corresponding German Patent Application No. DE 10 2022 212 179.1.

*Primary Examiner* — Bradley T King
(74) *Attorney, Agent, or Firm* — COZEN O'CONNOR

(57) ABSTRACT

Method for operating an oscillation damper with at least one adjustable damping valve, having a working cylinder and a working chamber on the piston rod side and a working chamber remote from the piston rod. The damping medium is pumped into one of the two working chambers by a pump connected to the oscillation damper. A non-uniform pumping action is compensated by a pulsation device The adjustable damping valve is set, depending on the volume flow currently being conveyed into the working chamber by the pump, so that it alternates between two damping force settings and is in antiphase to the conveyed volume of the pump.

10 Claims, 2 Drawing Sheets

(56) References Cited

U.S. PATENT DOCUMENTS

| | | | | |
|---|---|---|---|---|
| 2022/0373003 | A1* | 11/2022 | O'Shea .................. | B60G 13/00 |
| 2024/0010039 | A1* | 1/2024 | Selden ................... | B60G 13/08 |
| 2024/0149631 | A1* | 5/2024 | Lenniger ............ | B60G 17/0408 |
| 2025/0058597 | A1* | 2/2025 | Paleczek ............ | B60G 17/0152 |

FOREIGN PATENT DOCUMENTS

| | | |
|---|---|---|
| DE | 102018221576 | 6/2020 |
| DE | 102019215984 | 4/2021 |
| DE | 102020214277 | 3/2022 |

* cited by examiner

METHOD FOR OPERATING AN ADJUSTABLE OSCILLATION DAMPER WITH A CONNECTED PUMP

BACKGROUND OF THE INVENTION

1. Field of the Invention

The disclosure relates to a method for operating an adjustable oscillation damper and a connected pump.

2. Description of Related Art

An adjustable oscillation damper with a connected pump is known from DE 10 2015 218 494 A1. The oscillation damper comprises one adjustable damping valve per working direction. In principle, an adjustable damping valve can be used separately per working direction or alternatively an adjustable damping valve can be used which has a bidirectional flow.

To optimize the operating behavior of the oscillation damper in terms of its damping force in combination with an optimally efficient pump, it is known to open the at least one damping valve to such an extent in terms of its damping force that, on the one hand, a sufficient damping force can still be achieved and, on the other hand, no volume flows which significantly compensate the action of the pump flow through the damping valve, i.e. the volume flows through the adjustable damping valves should not represent leakage flows which are not acceptable with respect to the pumping action.

A fundamental problem with the operation of such an oscillation damper is the generation of noise. When damping medium is recirculated by the pump inside the oscillation damper between the working chambers, or additional damping medium is pumped in from a reservoir, a non-uniform pumping action also occurs in the case of a gear pump. Although the effect can be improved by adapting the pump, for example with a high number of teeth and a high speed, the range of the required conveyed volume is in many cases so great that the pump cannot be operated permanently at a high speed.

It is, for example, also known from DE 10 2020 214 277 B3 to design the oscillation damper with a pulsation damper but the pulsation damper represents a further component, in addition to the pump and in many cases an additional reservoir, which has to be connected to the oscillation damper and for which structural space has to be made available.

DE 10 2015 214 639 A1 discloses a pump which is intended to have improved pulsation behavior by virtue of its particular structure.

SUMMARY OF THE INVENTION

An object of one aspect of the present invention is solving the noise problem known from the prior art.

One aspect of the invention is setting the adjustable damping valve, depending on the volume flow currently being conveyed into the working chamber by the pump, so that it alternates between two damping force settings and is in antiphase to the volume flow of the pump.

The adjustable damping valve, which represents a component that would be present anyway, serves as a pulsation device. According to one aspect of the invention, the effects of the pulsation of the pump are minimized very closely in the spatial area in which the transmission of the noise source to the vehicle structure also takes place. It is not a question so much of optimizing the pump acoustically as optimizing the noise insulation of the oscillation damper on the vehicle structure. Although oscillation dampers are elastically mounted on the axle and vehicle structure via their bearing points, this mounting does not meet all requirements. The presence of the pulsation damping close to or even in the oscillation damper as a transmission element is therefore advantageous.

In the most simple design, the adjustable damping valve can assume a maximum opening position in the case of a pressure peak within the alternating conveying capacity of the pump and can reassume the damping force setting required for generating the damping force in the case of a minimum conveying capacity. In one aspect, an upper damping force value of the adjustable damping valve is adapted to a lower current conveyed volume value of the pump, and a lower damping force value is adapted to an upper current conveyed volume flow. The adjustment range of the adjustable damping valve can be considerably limited as a result. An actuator inside the adjustable damping valve is consequently loaded to a much lower degree.

In order to protect the adjustable damping valve and hence the oscillation damper, the method is deactivated above a defined pulsation frequency. It has additionally been established that the pulsation is no longer felt as strongly in this operating range.

To further optimize the method, the alternating damping force setting is suspended when damping medium is conveyed by the pump into an enlarging working chamber. It is intended that the theoretically occurring damping force loss which is associated with the use of the method is minimized by this measure.

To do this, the conveying direction of the pump can be detected. For example, a rotary sensor can be used which also detects the direction of rotation of the pump in addition to the speed.

In addition, the working direction of the oscillation damper can be detected. To do this, pressure sensors in the working chambers of the oscillation damper can be used or a travel sensor can be used which is in many cases present in a vehicle with adjustable damping valves.

It is made significantly easier to carry out the method if the pulsation behavior of the pump is identified before starting the method. The adjustment of the adjustable damping valve can be optimized and the measuring effort in the vehicle greatly simplified. The pulsation behavior of the pump does not have to be performed before starting the method each time. The method can be implemented just once when installing the hydraulic device and the oscillation damper. The more frequently the method is used, the more precisely can changes to the components, for example due to wear, be taken into account.

In order to further optimize the method, a noise emission signal is supplied by an acceleration sensor. The generation of noise from the pump depends on various factors, for example on the current driving situation in which a vehicle is. There is a significant difference, for example, between taking a corner on an ideally flat road and one damaged with potholes. The noise emission signal serves to readjust the adjustable damping valves. It can be the case that, for example in the case of a badly damaged road, the pump causes a greater pulsation but, because of the unevenness of the road, does not show any appreciable acoustic effect. The adjustment of the damping valves can then be orientated with the focus on optimal damping of the vehicle movement.

Alternatively, a noise emission signal can also be supplied by the pressure sensor. Direct measurement of the noise emission and the supply of a noise emission signal can be made by a microphone.

BRIEF DESCRIPTION OF THE DRAWINGS

The invention is to be explained in detail on the basis of the following description of the Figures.

In the drawings.

DETAILED DESCRIPTION OF THE PRESENTLY PREFERRED EMBODIMENTS

Figure 1:
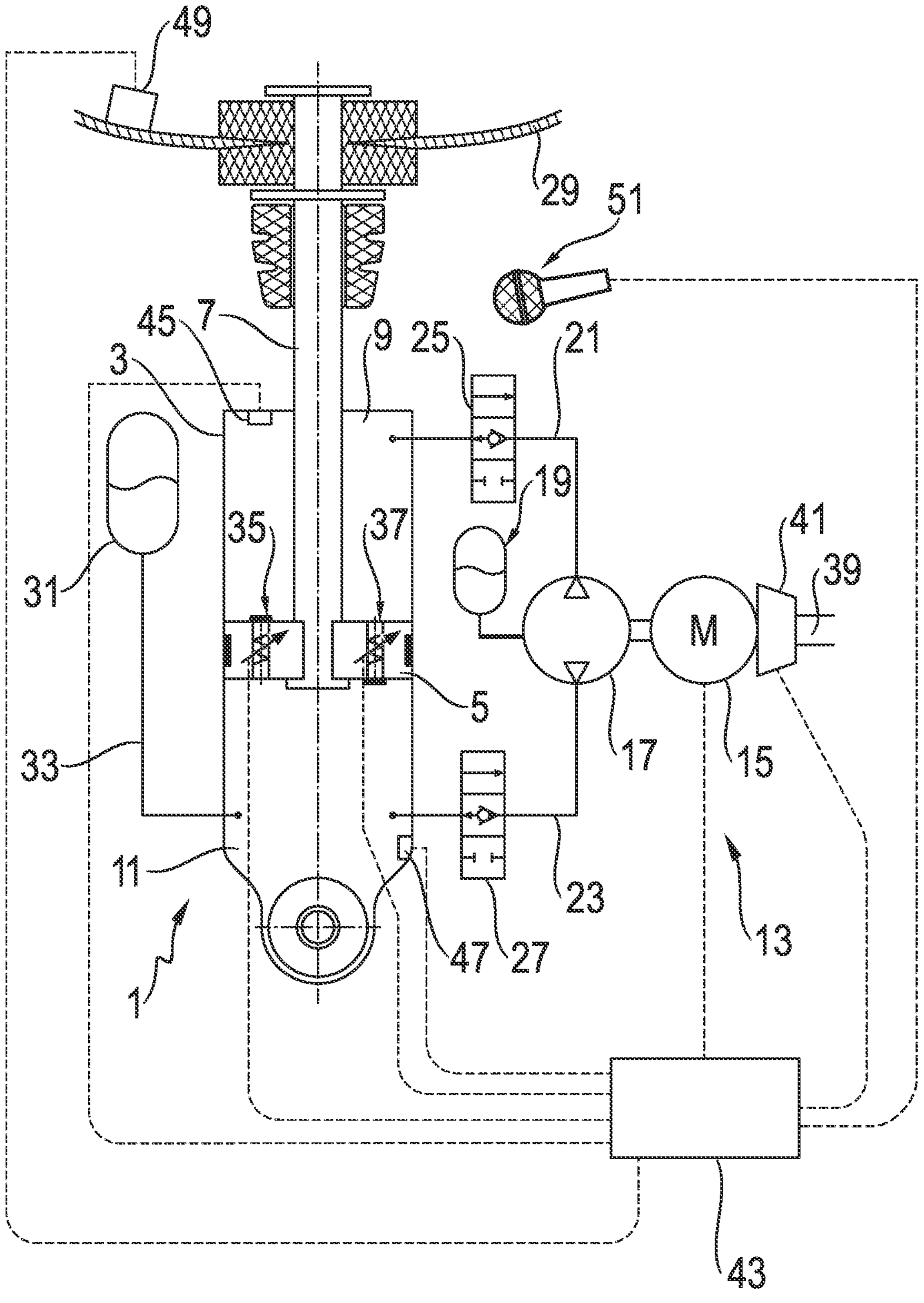
FIG. 1 is an equivalent diagram of the oscillation damper with a connected pump.

FIG. 1 shows an oscillation damper 1 with a working cylinder 3 in which a piston 5 on a piston rod 7 makes an axial operating movement. The piston 5 divides the working cylinder 3 into a working chamber 9 on the piston rod side and a working chamber 11 remote from the piston rod which are both completely filled with damping medium. The two working chambers 9; 11 are connected to a hydraulic device 13 which comprises a pump 17, driven by a motor 15, with two conveyor devices and a reservoir 19. A first fluid path 21 extends from the working chamber 9 on the piston rod side to the pump 7, and a second fluid path 23 connects the working chamber 11 remote from the piston rod to the pump 17. The two fluid paths 21; 23 can optionally have a valve device 25; 27 with which the respective fluid path 21; 23 can be controlled. The controlling can take the form, for example, of complete blocking, an open position, or a one-way flow direction. Damping medium can be recirculated by the pump 17 between the two working chambers 9; 11, or damping medium can be conveyed from the reservoir 19 to additionally fill a working chamber 9; 11. Both measures serve to stabilize a vehicle structure 29 which is illustrated only indicatively.

The oscillation damper 1 furthermore features a compensation chamber 31 for compensating the volume of damping medium displaced when the piston rod 7 is retracted and extended from the working cylinder 3. The compensation chamber 31 is connected to the working chamber 11 remote from the piston rod via a third fluid path 33.

Regulating the damping force of the oscillation damper 1 by being able to modify the damping force of the oscillation damper 1 is also provided in addition to regulating the monitoring of the structure. For this purpose, for example two adjustable damping valves 35; 37 are provided in the piston, by which in each case the flow resistance of the piston in the direction of retraction and extension from the working cylinder can be set. A single adjustable damping valve with two flow directions can also be used. The valves can also be arranged outside the working cylinder. Reference is made, for example, to DE 10 2019 215 984 A1. The oscillation damper can in principle be designed as a monotube or twin-tube damper.

Based on the conceptual design of the oscillation damper 1 according to FIG. 1, one aspect of the invention consists of a method for operating the oscillation damper 1 with the at least one adjustable damping valve, and the pump connected to the oscillation damper by which the damping medium is pumped into one of the two working chambers. Even high-quality pumps do not achieve an absolutely constant conveyed volume at a constant drive speed. The adjustable damping valves 35; 37, which are set depending on the volume flow currently conveyed by the pump 17 into the working chambers 9; 11 so that it alternates between two damping force settings and is in antiphase to the volume flow, serve to compensate the effects of the non-uniform or pulsed conveying capacity in the working cylinder 3.

The conveying capacity of the pump fluctuates about an average value, i.e. the pump 17 does not convey alternately 0 or 100% and instead works within a much smaller window, for example between 98% and 102% of the average conveyed volume. Associated therewith is a damping force setting of the adjustable damping valve 35; 37 at which an upper damping force value of the adjustable damping valve 35; 37 is adapted to a lower current conveyed volume value of the pump 17, and a lower damping force value is adapted to an upper current conveyed volume flow. A damping force is thus available at all times which is also adjusted only slightly relative to a target damping force.

The damping force adjustment per se proceeds very dynamically because the wheel is subject to high-frequency excitations with different amplitudes. This damping force adjustment is superimposed with the adaptation to the conveying capacity of the pump 17. For protection against an in particular thermal overloading of the adjustable damping valve 35; 37, the method is deactivated above a defined pulsation frequency.

A further protective but also energy-saving measure consists in suspending the alternating damping force setting when damping medium is conveyed by the pump 17 into a working chamber that enlarges because of a movement of the piston rod. To do this, the conveying direction of the pump 17 is detected. In the case of a pump 17 with a single conveying direction and a valve control system for directing the conveyed volume into the desired working chamber, the valve position can, for example, be detected. In the case of a pump 17 with two conveying directions, the direction of rotation can be sensed by a rotation sensor 41 of a pump shaft.

The working direction of the oscillation damper 1 can furthermore be detected in order to optimize the method. To do this, the working chambers 9; 11 can be designed with pressure sensors 45; 47 which are evaluated. Alternatively, a travel sensor can detect, for example, the movement of the piston rod and thus also the direction of movement of the piston rod 7.

It is in principle expedient for carrying out the method if the pulsation behavior of the pump 17 is identified before starting the method, for example by trials or alternatively calculations, the results of which are stored in a control module 43 of the oscillation damper 1.

During the method, the pulsation can be detected indirectly by a noise emission signal which is supplied by an acceleration sensor 49. The use of at least one acceleration sensor 49 offers the advantage that there is no need for a pressure sensor, which is always more expensive than an acceleration sensor 49, inside the oscillation damper 1 or the pump 17. The acceleration sensor can be installed on the piston rod 7 of the oscillation damper 1 or alternatively on the vehicle structure 29 of the vehicle. If, because of the road conditions and/or the driving situation and despite the pulsation of the pump 17, no noise is generated, which is considered to be disruptive, the method can then be suspended or at least the activation of the adjustable damping valves 35; 37 can be effected with a higher priority for optimal oscillation damping 1, for example such that the adjustable damping valves 35; 37 are set to a higher damping force. The pressure sensors 45; 47 can also be used to supply a noise signal because there is a direct correlation between the pressure situation and the emission of noise.

It is alternatively possible to supply a noise signal by a microphone which can be arranged, for example, in the passenger compartment or also in the vicinity of the oscillation damper.

Figure 2:
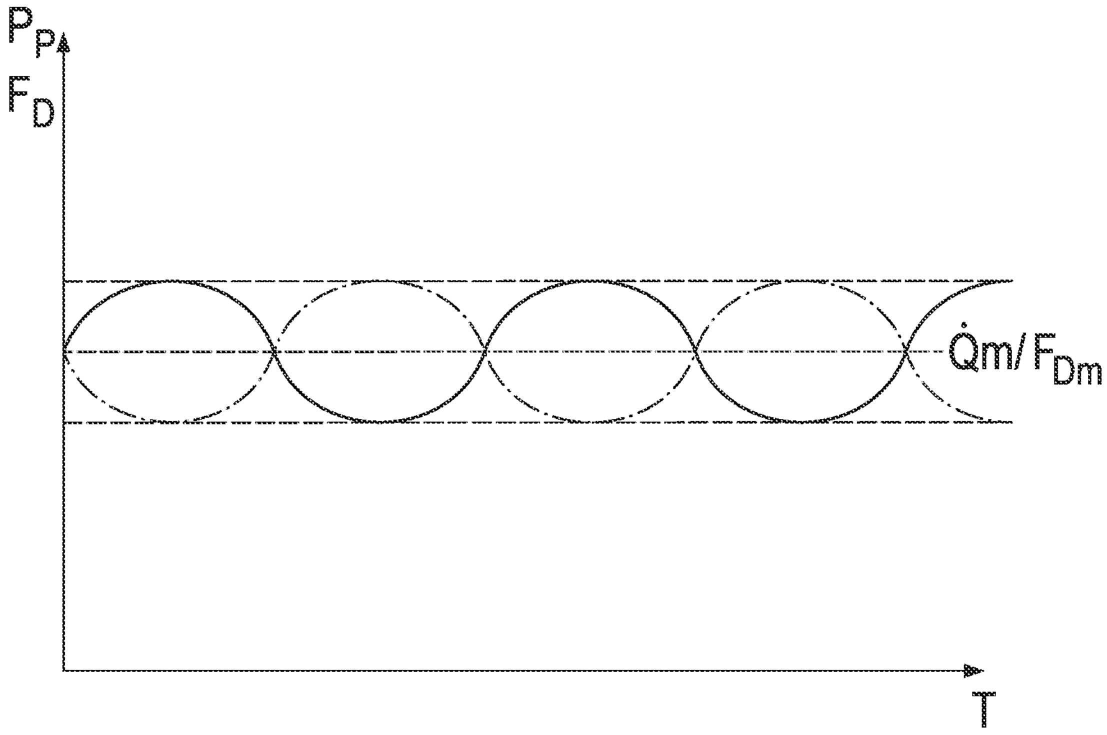
FIG. 2 is a damping force/conveyed volume graph.

FIG. 2 shows a graph of the function of the method. The solid line describes the conveyed volume Q of the pump 17. The conveyed volume always fluctuates about an average value Qm which is dependent on the speed. For the sake of simplicity, it is assumed in FIG. 2 that the pump 17 is at a constant speed. At a current maximum conveying capacity, an adapted minimum damping force is set at the adjustable damping valves 35; 37, the damping force setting of which is represented at the dot-dash line.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating an oscillation damper having at least one adjustable damping valve with a working cylinder and a first working chamber on a piston rod side and a second working chamber remote from the piston rod side, comprising:

pumping damping medium into one of the first and second working chambers by a pump connected to the oscillation damper;

compensating a non-uniform pumping action of the pump by a pulsation device;

setting the at least one adjustable damping valve, depending on a volume flow currently being conveyed into the first and second working chambers by the pump, to alternate between two damping force settings that is in antiphase to a conveyed volume of the pump.

2. The method as claimed in claim 1, wherein an upper damping force value of the at least one adjustable damping valve is set to a lower current conveyed volume value of the pump, and a lower damping force value is set to an upper current conveyed volume flow.

3. The method as claimed in claim 1, wherein the method is deactivated above a defined pulsation frequency.

4. The method as claimed in claim 1, wherein an alternating damping force setting is suspended when damping medium is conveyed by the pump into an enlarging working chamber.

5. The method as claimed in claim 1, wherein a conveying direction of the pump is detected.

6. The method as claimed in claim 1, wherein a working direction of the oscillation damper is detected.

7. The method as claimed in claim 1, wherein a pulsation behavior of the pump is identified before starting the method.

8. The method as claimed in claim 1, wherein a noise emission signal is supplied by an acceleration sensor.

9. The method as claimed in claim 1, wherein a noise emission signal is supplied by a pressure sensor.

10. The method as claimed in claim 1, wherein a noise emission signal is supplied by a microphone.

* * * * *